US008386296B2

(12) United States Patent
Hage et al.

(10) Patent No.: US 8,386,296 B2
(45) Date of Patent: Feb. 26, 2013

(54) SYSTEM AND METHOD FOR MANAGING AND MONITORING SUPPLY COSTS

(75) Inventors: Joe Hage, San Jose, CA (US); Raghu Krishnan, Sunnyvale, CA (US); Joel Nave, San Jose, CA (US); Harish Butani, Fremont, CA (US)

(73) Assignee: Agile Software Corporation, San Jose, CA (US)

( * ) Notice: Subject to any disclaimer, the term of this patent is extended or adjusted under 35 U.S.C. 154(b) by 1590 days.

(21) Appl. No.: 10/324,174

(22) Filed: Dec. 18, 2002

(65) Prior Publication Data

US 2003/0172008 A1 Sep. 11, 2003

Related U.S. Application Data

(60) Provisional application No. 60/363,400, filed on Mar. 8, 2002.

(51) Int. Cl.
*G06Q 99/00* (2006.01)

(52) U.S. Cl. ........... 705/7.35; 705/10; 705/29; 705/400; 700/97

(58) Field of Classification Search ............... 705/1, 400, 705/26, 80, 7, 10, 1.1, 8, 22, 29, 37, 7.31, 705/7.35; 717/108; 700/121, 97; 716/1; 1/1; 707/203, 999.009, 783, 999.001
See application file for complete search history.

(56) References Cited

U.S. PATENT DOCUMENTS

| | | | |
|---|---|---|---|
| 4,887,206 A | 12/1989 | Natarajan | |
| 5,537,590 A | 7/1996 | Amado | |
| 5,701,400 A | 12/1997 | Amado | |
| 5,819,249 A | 10/1998 | Dohanich et al. | |
| 5,918,226 A | 6/1999 | Tarumi et al. | |
| 5,970,476 A | 10/1999 | Fahey | |
| 5,995,716 A | 11/1999 | Harrington et al. | |
| 6,289,354 B1 | 9/2001 | Aggarwal et al. | |
| 6,330,552 B1* | 12/2001 | Farrar et al. | 705/400 |
| 6,496,208 B1 | 12/2002 | Bernhardt et al. | |
| 6,601,234 B1* | 7/2003 | Bowman-Amuah | 717/108 |
| 6,725,122 B2* | 4/2004 | Mori et al. | 700/121 |
| 6,946,343 B2 | 9/2005 | Liou | |
| 7,020,701 B1* | 3/2006 | Gelvin et al. | 709/224 |
| 7,130,807 B1* | 10/2006 | Mikurak | 705/7 |
| 7,188,075 B1* | 3/2007 | Smirnov | 705/7.35 |
| 7,310,624 B1 | 12/2007 | Aggarwal et al. | |
| 7,353,467 B2* | 4/2008 | Robertson et al. | 716/1 |
| 7,395,193 B1* | 7/2008 | Yelich et al. | 703/6 |
| 7,610,286 B1* | 10/2009 | Yu et al. | 1/1 |
| 7,610,312 B1* | 10/2009 | Topolovac et al. | 1/1 |
| 7,865,867 B2 | 1/2011 | Potter et al. | |
| 2001/0047387 A1* | 11/2001 | Brockhurst | 709/203 |

(Continued)

OTHER PUBLICATIONS

U.S. Appl. No. 60/333,483, filed Nov. 28, 2001.*

(Continued)

*Primary Examiner* — John Hayes
*Assistant Examiner* — Freda A Nelson
(74) *Attorney, Agent, or Firm* — Kilpatrick Townsend & Stockton LLP

(57) ABSTRACT

Techniques for managing and estimating supply costs, by drilling down through detailed component lists of tree structured component specifications and rolling up pricing estimates based on predetermined, projected and available criteria and automatically accounting for costs in an organized manner. The costs may be analyzed from a historical perspective, accounting for future costs based on historical cost data within a given past or future date range. The costs may also be analyzed based on average costs of available costed items. Quotes can be received from suppliers for use in estimating supply costs. In addition, scenarios such as partnership splits, where multiple suppliers manufacture and supply common components to buyers at same or different prices, can be taken into account.

14 Claims, 11 Drawing Sheets

U.S. PATENT DOCUMENTS

| | | | | |
|---|---|---|---|---|
| 2002/0023060 A1* | 2/2002 | Cooney et al. | | 705/400 |
| 2002/0052862 A1* | 5/2002 | Scott et al. | | 707/1 |
| 2002/0072986 A1* | 6/2002 | Aram | | 705/26 |
| 2002/0087440 A1* | 7/2002 | Blair et al. | | 705/29 |
| 2002/0091680 A1 | 7/2002 | Hatzis et al. | | |
| 2002/0116300 A1 | 8/2002 | DeBusk et al. | | |
| 2002/0152133 A1* | 10/2002 | King et al. | | 705/26 |
| 2002/0174000 A1* | 11/2002 | Katz et al. | | 705/7 |
| 2003/0009410 A1* | 1/2003 | Ramankutty et al. | | 705/37 |
| 2003/0014287 A1* | 1/2003 | Williams et al. | | 705/7 |
| 2003/0028401 A1 | 2/2003 | Kaufman et al. | | |
| 2003/0074329 A1* | 4/2003 | Jandasek et al. | | 705/80 |
| 2003/0172010 A1 | 9/2003 | Butani et al. | | |
| 2003/0181991 A1 | 9/2003 | Chau et al. | | |
| 2003/0187991 A1 | 10/2003 | Lin et al. | | |
| 2004/0139001 A1* | 7/2004 | Henriques et al. | | 705/39 |
| 2006/0100829 A1* | 5/2006 | Lynch et al. | | 703/1 |

OTHER PUBLICATIONS

Spera, Jason; "Untangling the Web of Collaboration", Jan. 2001, Circuits Assembly; ProQuest Computing p. 98.*

Hollingsworth, "Workflow Management Coalition The Workflow Reference Model," Workflow Management Coalition WfMC, Hampshire, UK, pp. 1-55, 1995.

Marquina et al., "Integrating Autonomous Problem Resolution Models with Remedy," CERN, IT Divisional Reports Year 2000, pp. 1-5, Feb. 2000.

Non-Final Office Action for U.S. Appl. No. 10/321,104, Mailed Feb. 3, 2009, 16 pages.

Advisory Action for U.S. Appl. No. 10/321,104, mailed Oct. 26, 2009, 3 pages.

Ferreira, D., et al., "A Workflow Management System for Coordinating Distributed Information-Based Business Processes," AAAI Technical Report WS-99-02, Compilation Copyright 1999, AAAI pp. 1-7.

Non-Final Office Action for U.S. Appl. No. 10/321,104, mailed Jan. 20, 2010, 13 pages.

Non-Final Office Action for U.S. Appl. No. 10/323,564, mailed Oct. 7, 2009, 12 pages.

WfMC, "Workflow Management Coalition Terminology & Glossary," The Workflow Management Coalition Specification, Document No. WFMC-TC-1011, Issue 3.0, Feb. 1999, Copyright 1994-1999 Workflow Management Coalition, pp. 1-65.

Zourmba, H., "Automating Management Tasks Within a Distributed Network Computing Environment," Diploma Thesis, Berlin University, Berlin Germany Mar. 10, 2000, pp. i-ix, 1-79.

Final Office Action for U.S. Appl. No. 10/321,104, Mailed on Aug. 5, 2009; 14 pages.

Non-Final Office Action for U.S. Appl. No. 10/321,104, Mailed on Aug. 7, 2008, 14 pages.

Final Office Action for U.S. Appl. No. 10/321,104, Mailed on Nov. 28, 2007, 11 pages.

Non-Final Office Action for U.S. Appl. No. 10/321,104, Mailed on Jul. 2, 2007, 9 pages.

Non-Final Office Action for U.S. Appl. No. 10/321,104, Mailed on Jan. 29, 2007, 8 pages.

Final Office Action for U.S. Appl. No. 10/321,104, Mailed on Jul. 31, 2006, 8 pages.

Non-Final Office Action for U.S. Appl. No. 10/321,104, Mailed on Dec. 20, 2005, 8 pages.

Restriction Requirement for U.S. Appl. No. 10/202,130, Mailed on Dec. 19, 2005; 6 pages.

Restriction Requirement for U.S. Appl. No. 10/323,564, Mailed on Apr. 9, 2009; 7 pages.

Final Office Action for U.S. Appl. No. 10/323,564, Mailed on Oct. 21, 2008, 12 pages.

Non-Final Office Action for U.S. Appl. No. 10/323,564, Mailed on Feb. 27, 2008, 8 pages.

Restriction Requirement for U.S. Appl. No. 10/323,564, Mailed on Nov. 9, 2007; 6 pages.

Final Office Action for U.S. Appl. No. 10/321,104, mailed on Jul. 7, 2010, 13 pages.

Advisory Office Action for U.S. Appl. No. 10/323,564, mailed on Aug. 3, 2010, 3 pages.

Final Office Action for U.S. Appl. No. 10/323,564, mailed Mar. 31, 2010, 9 pages.

Notice of Allowance for U.S. Appl. No. 10/321,104 mailed on Sep. 16, 2010; 5 pages.

* cited by examiner

FIG. 3B  308

For The Supplier (or all Component Suppliers) (308.02):
- Consider Prices of all MPNs of the Item
- Choose Type of Price based on the Filter Criteria
- Consider prices of all Price Points that subsume the Analysis PricePoint

↓

Based on Input Selection Criteria Choose Winner (308.04):
- In case of Tie Breaks, apply the Secondary and Tertiary Selection Criteria
- Then, apply the last criteria. If there are still tie breaks, then arbitrarily pick the first.
- In case of an EMS Provider, the winner is an MPN (Manufacturer Part Number)
- In case of Component Suppliers, the winner is a Component Supplier and an MPN
- Copy the winner's prices (for all Price Points) into the Analysis Table.

FIG. 3C  310

For The Supplier (or all Component Suppliers) (310.02):
- Consider Prices of all MPNs of the Item meeting the Filter Criteria
- Consider prices of all Price Points that subsume the Analysis PricePoint
- Loop over all the Price Points (Loop)

↓

For every Price Point (310.04):
- Pick the lowest Cost price for each MPN (across all Component Suppliers)
- In case of an EMS Provider there is only 1 price
- Using the lowest Cost, compute the Weighted Average Cost (WAC) across all MPNs in the AML, based on the AML Split
- Update the Analysis Table with the Average price for each Price Point

SYSTEM AND METHOD FOR MANAGING AND MONITORING SUPPLY COSTS

RELATED APPLICATIONS

The present application is related to U.S. Patent Application Serial No. 60/363,400, filed on Mar. 8, 2002, and entitled, "SYSTEM AND METHOD FOR MANAGING AND MONITORING WORKFLOW", the contents of which is hereby incorporated by reference.

The present application is also related to U.S. patent application Ser. No. 10/323,564, filed on Dec. 17, 2002, and entitled, "SYSTEM AND METHOD FOR ANALYZING DATA", the contents of which are hereby incorporated by reference.

BACKGROUND

The invention generally relates to managing and projecting business costs, and, more particularly, relates to a system and method for analyzing structured component specifications and rolling up pricing estimates based on predetermined and available criteria.

With the trend toward globalization and outsourcing of parts and components, companies require in-depth analysis of all levels of supply. Systems for estimating supply costs are well known in the industry, but few are robust enough to handle the complexity of modern business relationships. For example, many original equipment manufacturers (OEMs) instigate competition among its suppliers, allowing them to bid on different components and assemblies. Such a business scenario promotes requests for quotes (RFQs) to suppliers, related offers, counter-offers, negotiations, and multitudes of related transactions. Many complex relationships result from different business structures, which are difficult to manage and monitor. Discounts, whether quantity, promotional or other discounts, rebates, etc., are desired by end users of products, and make it even more difficult to monitor supply costs. To complicate matters further, markets change, costs change and other business factors change over time. It is important for a business to try to monitor these changing costs as well as the impacts of such changes on a business.

Conventional applications are available that present cost information in a tabular form. Such applications are unable to address changing cost information in a business environment. Therefore, it would be useful to provide a method and system configured to better manage and project business costs. As will be evident by the description below, the invention accomplishes this in an elegant manner.

BRIEF DESCRIPTION OF THE DRAWINGS

FIG. 2A-1 is a flow diagram of a part of the method for performing quality rollup of FIG. 2A.

FIG. 2A-2 is a flow diagram of a part of the method for performing quality rollup of FIG. 2A.

FIG. 3B is a flow diagram of a subprocess of step 308 of FIG. 3A in one embodiment. FIG. 3C is a flow diagram of a subprocess of step 310 of FIG. 3A in one embodiment.

DETAILED DESCRIPTION

Figure 1A:
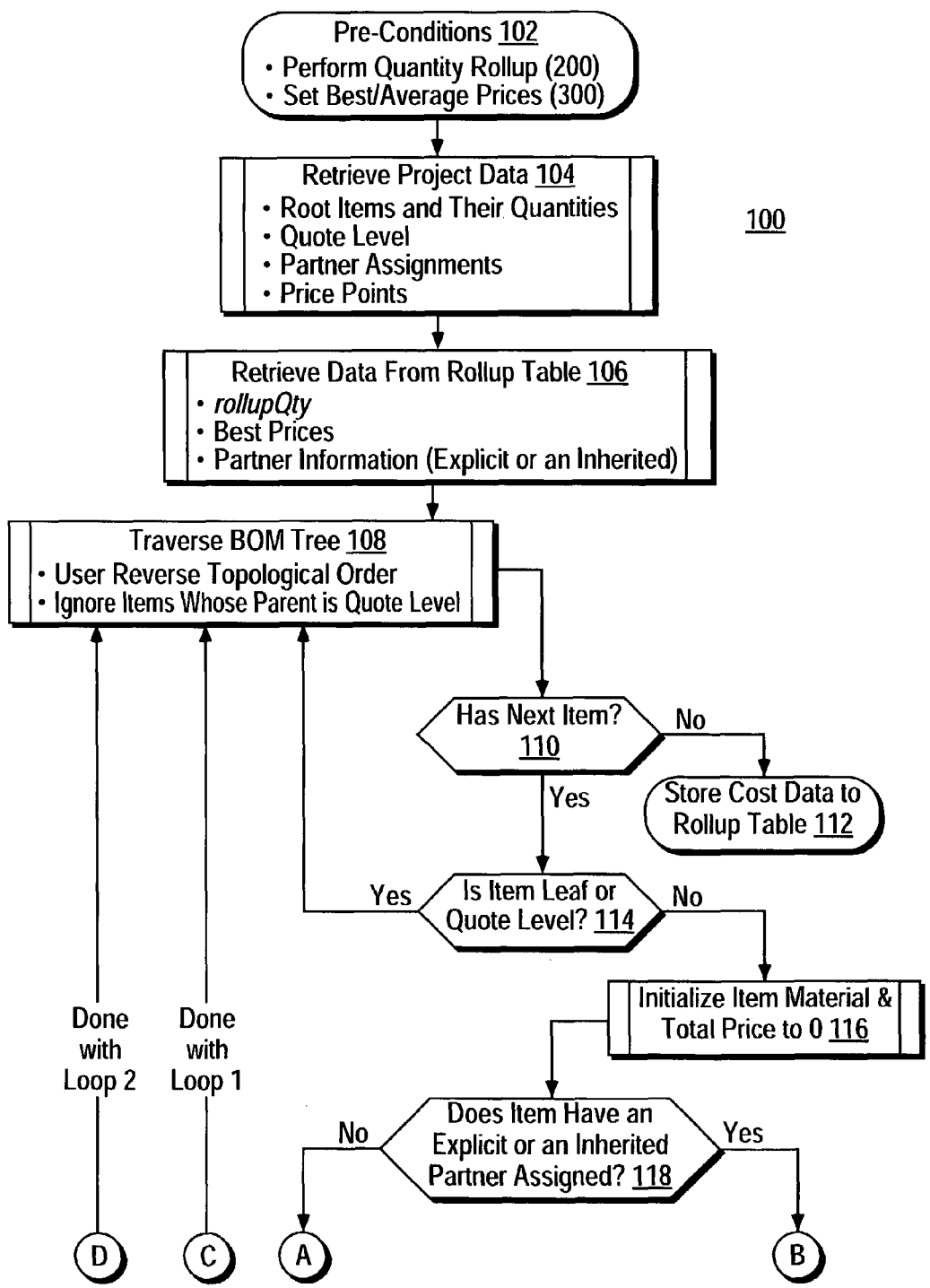
FIG. 1A is a flow diagram of a part of the method of managing a BOM of FIG. 1.
Figure 1B:
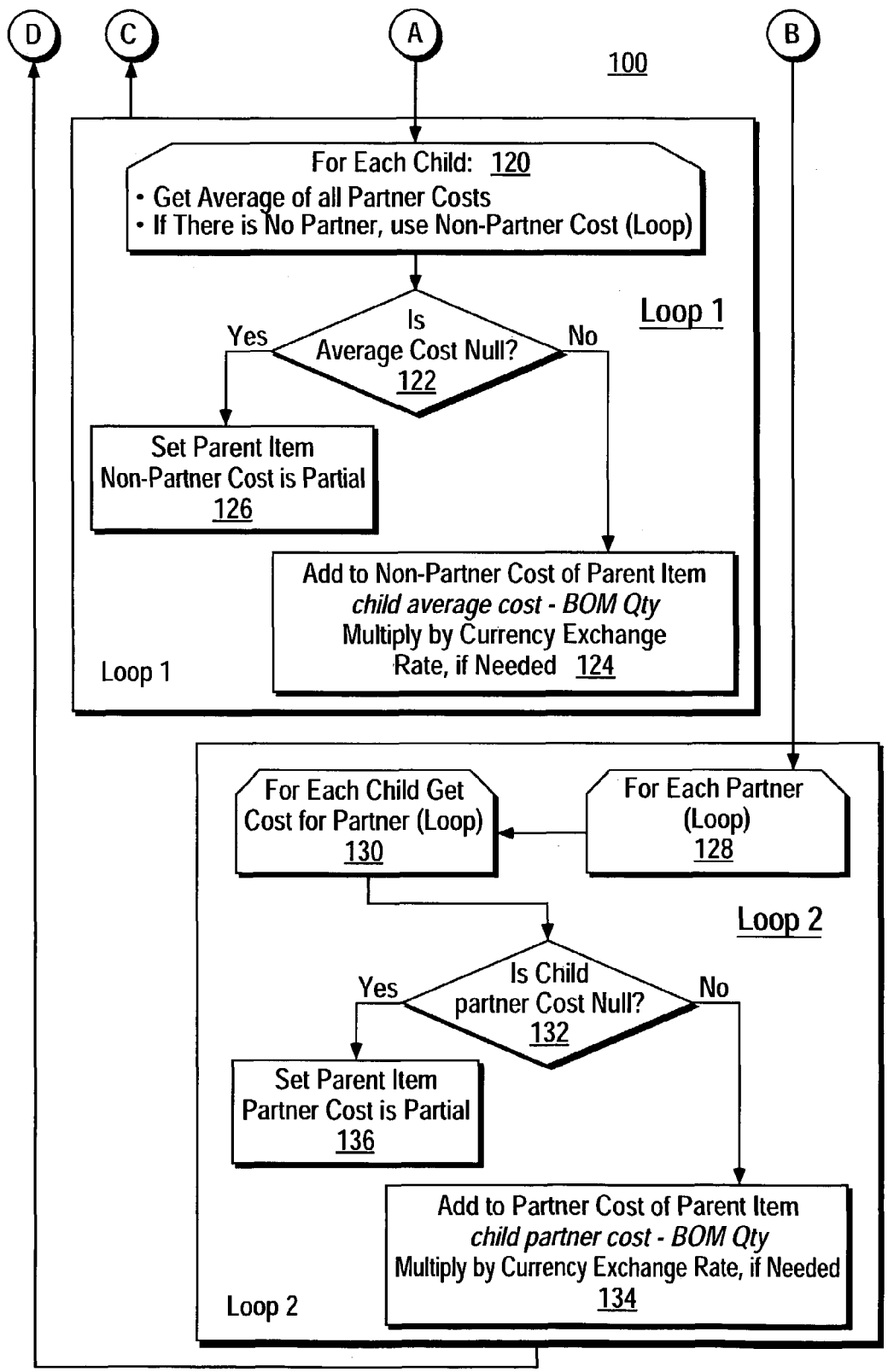
FIG. 1B is a flow diagram of a part of the method of managing a BOM of FIG. 1.

The invention provides a system and method for managing and estimating supply costs, by drilling down through detailed component lists of tree structured component specifications and rolling up pricing estimates based on predetermined, projected and available criteria, including price estimates quoted from suppliers, contract prices, published catalog pricing, foreign currency rates, time-dependent pricing, cost averaging, historical data and other criteria. Typically, cost information changes over time, making managing such costs complicated. The invention enables the user tasks to be simplified by analyzing costs and automatically accounting for costs in an organized manner. The costs may be analyzed from a historical perspective, accounting for future costs based on historical cost data within a given past or future date range. The costs may also be analyzed based on average costs of available costed items. Average costs across suppliers may be fictitious, but they may provide a means for completing a cost analysis for purposes of business planning. In practical applications, the invention can address variations based on changing costs over time, availability of items and other factors.

The invention further provides a system and method to enable a buyer to receive quotes from suppliers to be used in estimating supply costs. Such a system may further include the ability to adapt to various supply scenarios, such as partnership splits, where multiple suppliers manufacture and supply common components to buyers at same or different prices. Information can be gathered from such suppliers and integrated into a hierarchical data structure, such as a bill of material (BOM), discussed below. A BOM may be used by a manufacturer such as an outsourced Electronics Manufacturing Supplier ("EMS") who assembles the various sub-assemblies or products for an Original Equipment Manufacturer ("OEM"). Cost and supply information can then be analyzed to allow a buyer to roll up cost information and accurately estimate and project business costs.

For example, one supplier may offer a quantity of a component at one price, and another supplier may offer a quantity of the same component at a different price. Also, a given supplier might provide the same exact cost for a part but the non-material labor costs for assembling the part might be different depending on the location at which they are to be supplied. If a purchaser ordered components from both companies, the cost metric could be determined by a simple formula. However, if the availability of the component changes between the companies, the formula would change, and any calculated cost analysis would be invalid. Therefore, a flexible analysis would be required to properly account for costs. The invention provides a means to account for costs in an ever-changing environment.

A business may produce an actual physical product, such as a computer made up of various component parts and systems, a food product made up of ingredients, elements and compounds, a pharmaceutical product such as drugs made up of elements, compounds and chemicals according to predetermined recipes, or other products that involve outsourced items or components. The invention may also be directed to managing and monitoring costs associated with services or project management. Individual services or tasks can be considered components for purposes of an embodiment of the invention, where the components are quantified according to their individual cost, and monitored and managed much like component parts for manufactured products. The units of measurement associated with such components could be temporal, such as hours, days and weeks. They could also be task based, or some other measure. And, monetary value can be associated with each measure. This makes the cost analysis similar to a manufactured product. The tasks and services may be broken down into their basic sub-tasks and sub-services, quantified, and categorized for monitoring and management purposes. The embodiments described below are directed to accounting for costs in a product production environment. However, the invention provides a means for monitoring and managing the costs of components, whether it is a manufactured product, project management or a service based business.

In one embodiment, the invention may embody the application of price and cost information to a BOM structure for the purpose of providing a quote to a customer. For example, suppliers could use such an application to bid to win contracts for manufacturing products for their customers. In such an application, the supplier applies price and cost information from RFQs to their suppliers or from a price repository to provide a bid proposal back to their potential customers.

In another embodiment, in a manufactured product application, the method is performed by analyzing detailed component lists to locate and retrieve cost information related to the component parts. The embodiment further includes a device and method configured to use this cost information to establish cost figures for component parts as well as finish products tasks or services. The component lists may be tree structured to allow pricing estimates to be automatically analyzed and rolled up in a hierarchical manner. This allows a user to analyze and project costs according to a defined algorithm.

In one embodiment, the invention provides a system and method for managing costs in the form of a BOM, and establishing cost figures for items within the BOM. Traditionally, BOMs are used for itemizing component of a product and their associated cost and supply data. According to the invention, a BOM may also apply to tasks and costs that relate to services and project management. As used herein, a "BOM" is any collection of data that identifies various components, elements, services, or processes that make up a product, a service, a process, or a project. For example, a bill of materials may identify multiple components that are used to assemble a finished product. In this example, the bill of materials may specify various information regarding each component, such as part numbers, quantities and the manner in which the multiple components are assembled with one another. In another example, a bill of materials identifies multiple services that are performed to complete a particular project. In this example, the bill of materials specifies how the multiple services are to be performed and how the results of the multiple services are used to complete the particular project. A particular bill of materials may contain any number of entries related to any number of products, services, processes or projects.

The invention is directed to analyzing available data associated with each BOM item, whether it is a component, task or other item, and completing the BOM for other items by rolling up values computed from algorithms. Data associated with these items may be completed in various ways depending on the availability of cost data. In prior art applications, only available cost data is used to fill in a BOM. Any projected costing is done in a separate analysis. The invention provides a means to analyze available data and trends of data in order to analyze and complete a BOM for cost management by a user. This can be done by analyzing historical records associated with a BOM, along with available data, trend algorithms and other factors to manage cost data. Rolling up may take into account best prices, average prices, cost, demand, supply, alternative components and sources, ranges of values, and other criteria. The cost figures that are rolled up may be based on predetermined and available criteria.

These criteria may include price estimates that are quoted from suppliers, task performers or service providers, which may be estimates of individual components or combinations of component parts. The criteria may also include calculations of foreign currency rates that may affect costs of various parts manufactured, sold, or otherwise procured in foreign countries. Criteria may also account for time-dependent pricing figures, such as limited offers from vendors, time deadlines on price quotes, limited promotional offers and other time dependent factors. Where parts are procured from numerous suppliers, criteria may also include the calculation of cost averaging over various suppliers.

Figures 1, 2A:
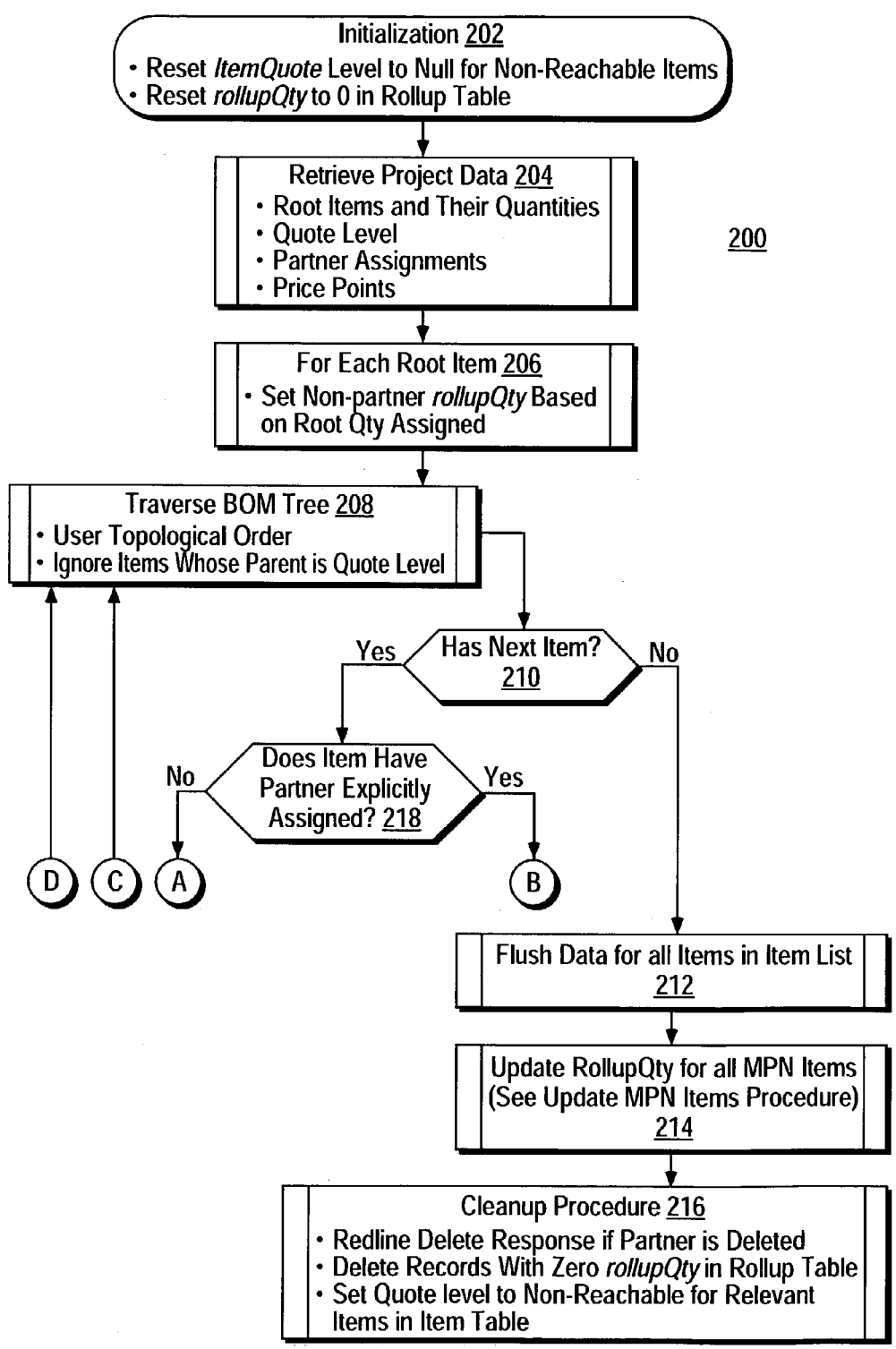
FIG. 1 is a flow diagram of a method of managing a BOM in one embodiment.
FIG. 2A is a flow diagram of a method for performing quality rollup in pre-conditions step 102 of FIG. 1 in one embodiment.
Figures 2, 2A:
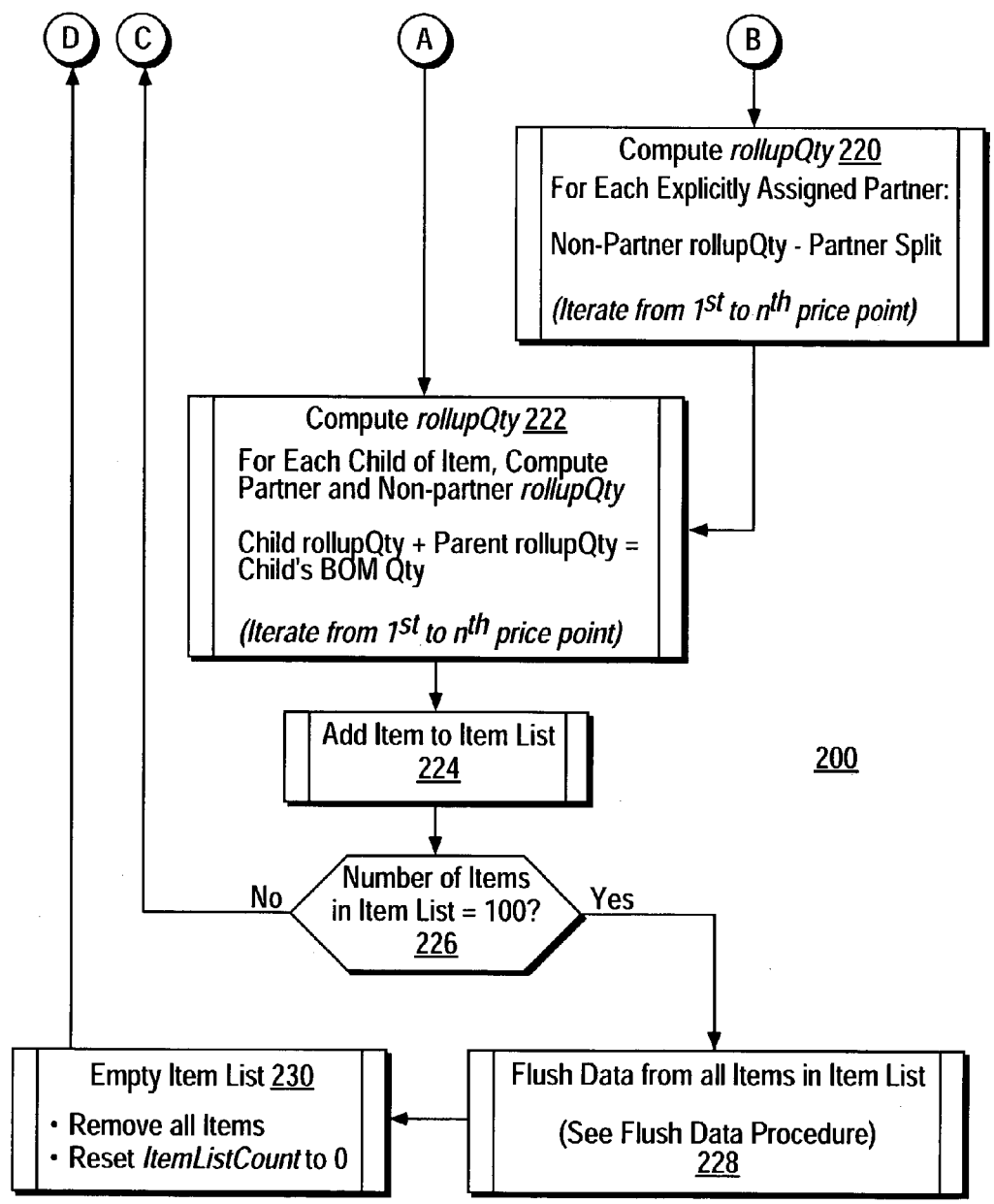

Quantity factors may also be accounted for in a BOM roll up. Quantities may change, as well as demand, supply and other factors. A buyer may purchase from multiple suppliers, which may individually produce and supply components in varying proportions. This puts the cost metric for any given product or project in flux. The invention provides a means to analyze such variations to give accurate cost factors. One such embodiment of the invention is illustrated in FIGS. 1-3 and their related description. For production applications, components and related tasks may be identified by different part numbers. Manufacturing part numbers (MPNs) are established by the manufacturers of components. The same components may be renamed with internal part numbers (IPNs) when received by a company consuming the manufactured part to standardize a naming scheme internally. Related flow diagrams described below illustrate an embodiment of a method of updating manufacturer part numbers (MPN) procedure, in contrast to the rolling up of internal part numbers (IPNs), which can be performed in a similar manner if required. In a preferred embodiment, in a final assembly environment, a BOM has all components listed with IPNs. A BOM may also have any associated MPNs, if any, listed as well. Other criteria that may be specific to a particular business application may also be taken into account.

In one embodiment of the invention, a system is established based on a bill of materials (BOM) for product specifications for a given company. In this embodiment, the BOM is generally made up of a list of component parts or component systems. In this regard, the product covered by the BOM is the parent, and the components are the children. Various business scenarios may be accommodated by such an embodiment, including several interrelated businesses with established business relationships. For example, an original equipment manufacturer (OEM) of a computer may operate according to a BOM that lists component parts such as a housing, a mother board and other components. It may also list component systems such as a hard drive, which contains multiple component parts by itself. A hard drive manufacturer may operate according to a BOM specifically configured for the disk drive and its components, and perhaps for a series of hard drives, each possibly having similar and different BOM component items. According to the invention, any type of BOM application can be configured to monitor and manage costs of individual BOM items, or children.

In a first stage, initial conditions of the business are defined by the system. These conditions include root items, which relate to top level assemblies that will be costed. For example, root items may include the basic product components or systems that are assembled by the business organization, such as a disk drive for a computer. For a disk drive manufacturer, the components parts of the individual disk drives make up the root items of the system's BOM. Similarly, in a project management scenario, the smallest task performed may define a root item of the process. The quantities of such root items may also be assessed before the cost calculations can commence.

Partnerships may also be defined as an initial condition. Here, the suppliers, their supplied component (which may be defined as a root item), their quantities supplied, pricing information, and other factors are defined. These, along with other information on the partnerships can then be used to factor costs associated with supplied components or systems. In a preferred embodiment, Total Cost is computed for one or more Partners. Partners are specified by a partner assignment operation, where Partners are assigned to a particular part, which may be a subassembly or component part. Additionally a Partner maybe assigned a business split, where a buyer proposes to purchase parts from multiple suppliers. In one embodiment, a partner is a supplier of an assembly or subassembly. For distinction, a supplier of a component may be referred to as a component supplier. According to the invention, the splits do not need to add up to 100% of the total amount required for the buyer. For example, a buyer may assign a split of 75% for Partner 1 and 50% for Partner 2. At the time of quoting, the buyer is exploring different options. One decision the buyer needs to make is how to split demand. To decide, the buyer may ask for quotes where the splits do not necessarily add up. Rollup algorithms allow a buyer to account for these discrepancies, and decide how to adjust orders according to optimal terms. One example of how partnerships structure can be used is in the high tech industry. In this industry, the OEMs negotiate and agree upon purchase agreements with the EMS providers on the quarterly production limits on a cost plus margin basis. The EMS providers can be treated as partners who have the responsibility to manufacture the entire component and provide cost details at each level to the OEM.

In most businesses, outsourcing and globalization requires very complex analyses of different product lines to monitor and manage costs of products as well as their individual component parts. Components parts may be manufactured in foreign countries that perform business transactions in different currencies, and that may be manufactured under different specifications. According to the invention, the costs of the individual component parts may be tracked and rolled up in a manner that allows product costs to be monitored and managed. Given a partnership relationship between a buyer, such as an OEM, and a supplier, the buyer can monitor and manage cost information provided by the supplier, as well as other suppliers of component parts and systems. According to the invention, once the buyer has the pricing information, it can monitor and manage the costs of the suppliers' component parts. As such, an embodiment may be configured as a distributed system for use in disparate locations.

The algorithm for calculating the cost can be very complex depending on the application. In modern business scenarios, outsourcing of products, components and services can be varied and complex. And, globalization of business adds yet another dimension of complexity to the analysis. These factors greatly burden a business with daunting administrative tasks of managing and monitoring costs of component parts, systems, services and tasks. According to the invention, these user tasks associated with cost management can greatly simplified and even performed automatically by a configured system.

The roll-up analysis may include an exchange into a standard currency, such as the U.S. dollar or the European Euro. Exchanging into a single currency serves to normalize the cost units for consistent calculations. Currency exchange calculations may occur at any step in the process that involves cost units to normalize the quantities.

The cost analysis may also take into account the time periods of the prices offered by suppliers. Typically, suppliers offer pricing over short periods of time. Manufacturers of products, however, want to plan ahead, often beyond these short periods. Algorithms used for cost rollup can take the rolling time periods into account, rolling the cost estimates related to the time periods forward in time. This allows a manufacturer to dynamically calculate prices on an ongoing basis.

According to the invention, quote level blocking may also be performed by a rollup algorithm. As such, suppliers will not be able to place a bid for the sub-components of a system, because the buyer has hidden it from the supplier using the quote level blocking mechanism. Quote level blocking is a manner of limiting pricing information that is acceptable to a buyer. A Quote Level allows the buyers to model their make and buy decisions at various levels of the BOM in the system. For example, when a supplier is placing bids to supply component parts, it may not be presumed that the buyer is offering the correct product. A supplier may want bids on an assembly or sub-system, such as a computer manufacture receiving bids on disk drives, and may not want to buy the sub-components, such as the disk drive sub-components. Again, suppliers will not be able to submit a bid, because they will never receive the component to bid on. An example is, Company A has a programmable chip. The programmable chip is usually made up of the following components, a blank, a label and software. This is displayed as a BOM structure with the components reporting to the programmable chip. A buyer might not care about the cost of the blank, label and software, rather it would want a total price for the whole thing. If the buyer sets the Quote Level as the Programmable Chip, the supplier will not have price entry fields for the other components. If a supplier attempts to submit a bid for the unwanted sub-components, the system may be configured to not accept the bid, hence block the bid. It may also respond with a counter proposal for the supplier to submit a bid on the finished assembly or sub-system. Thus, a buyer may limit the level in which a supplier may submit bids.

In a preferred embodiment, an item that has a quote level set will act as a component part for the purposes of rollup. Thus, its material and non-material cost will contribute to the rolled up cost, not the rolled up cost of its assembly. For example a computer is quoted for a motherboard that has a central processing unit (CPU), which costs $1.00, and a video card that costs $1.00 (assuming no other components). Ignoring non-material cost for the example, if quote level is not set, the cost of a motherboard is $2, and the total cost of a computer is $2. If, however, the quote level is set at motherboard, and the supplier provides a material cost $1.50, then the total cost of the computer is $1.50.

Suppliers may be derived from a predetermined list of manufacturers that supply particular components in an industry. Product industry information may be used to produce a list of preferred manufacturers for providing component parts. Similarly, service industry information may be used to produce lists of preferred service providers. In either case, according to the invention, an approved manufacturer list (AML) may be generated to indicate particular providers of components according to the components provided. If multiple suppliers are desired, an AML split may be established among a plurality of suppliers. These suppliers may then supply the buyer according to predetermined or otherwise configured pricing criteria, depending on the application. The split may be calculated according to pricing factors, supply capacity factors, quality factors, historical factors, or other factors depending on the business application. A split may also be determined according to business factors, such as a partner split. The metric for determining such a split may be defined by contractual obligations, strategic business objectives, or other business purposes. According to the invention, an algorithm can define a split according to user defined properties and used in a management system to manage costs associated with a business.

The invention further addresses changes made to products or components. In a product business scenario, engineering change orders (ECOs) can impact a business throughout its product lines with respect to cost. Also, supplier changes can impact a business' bottom line in many ways. As time goes on, material prices can also change in the market, causing related components to change accordingly. Similarly, in a service or project management scenario, sub-services and sub-tasks may change in cost, affecting the overall cost of the service or project. The invention provides a means to roll up cost estimates in the event of any change that affects costs in a business.

Other factors that may affect business cost are rebates. In one embodiment, the invention provides suppliers the ability to apply a negative quantity, or percentage value to achieve the discount. There are many ways to model rebate in a costing application. One example is to model them as negative material adders (expressed as percentages of base cost or as a fixed number) or non-material components of the price. These factors may be calculated into the metric depending on the particular business application. For example, an OEM may be aware of rebates that are given its suppliers by companies that supply the suppliers themselves. And the OEM may want to have the supplier factor such rebates into the cost metric. Similarly, discounts may be offered for quantity orders or other business reasons that OEMs may also want to take advantage of. According to the invention, such factors may be taken into account. In one embodiment, Price Adders may be applied to a material price. These adders can be positive or negative values, allowing the buyer or supplier to apply a discount, or to add a margin on top of the materials price.

Optionally, the invention further provides the ability of a business to track and illustrate changes to components. Such changes may include price changes, supplier changes, quantity changes, and other changes that affect the management and monitoring of costs of business supplies. These changes may be stored as versions of BOMs, for example, that highlight the changes. Such changes may be illustrated down to the level of root items, which may include individual components or sub-systems supplied to a business.

In one embodiment of the invention, a BOM item management system is provided that is enabled by a database where BOM items are stored. In such an embodiment, BOM items are represented by objects in a database. These objects have attributes or tags that are organized in a hierarchical manner. These objects may include extended attributes that define relationships with other objects. This enables the function of a logical tree structure to illustrate and define a BOM and all associated items and their relationships to one another. This allows for the BOM items as objects to interlink with one another for cost analysis purposes. The system can then traverse the BOM items according to an algorithm configured to perform cost analyses. Traversing can root out item values, insert values, create and maintain BOM items, produce results, and perform other tasks associated with managing a BOM.

Figure 2B:
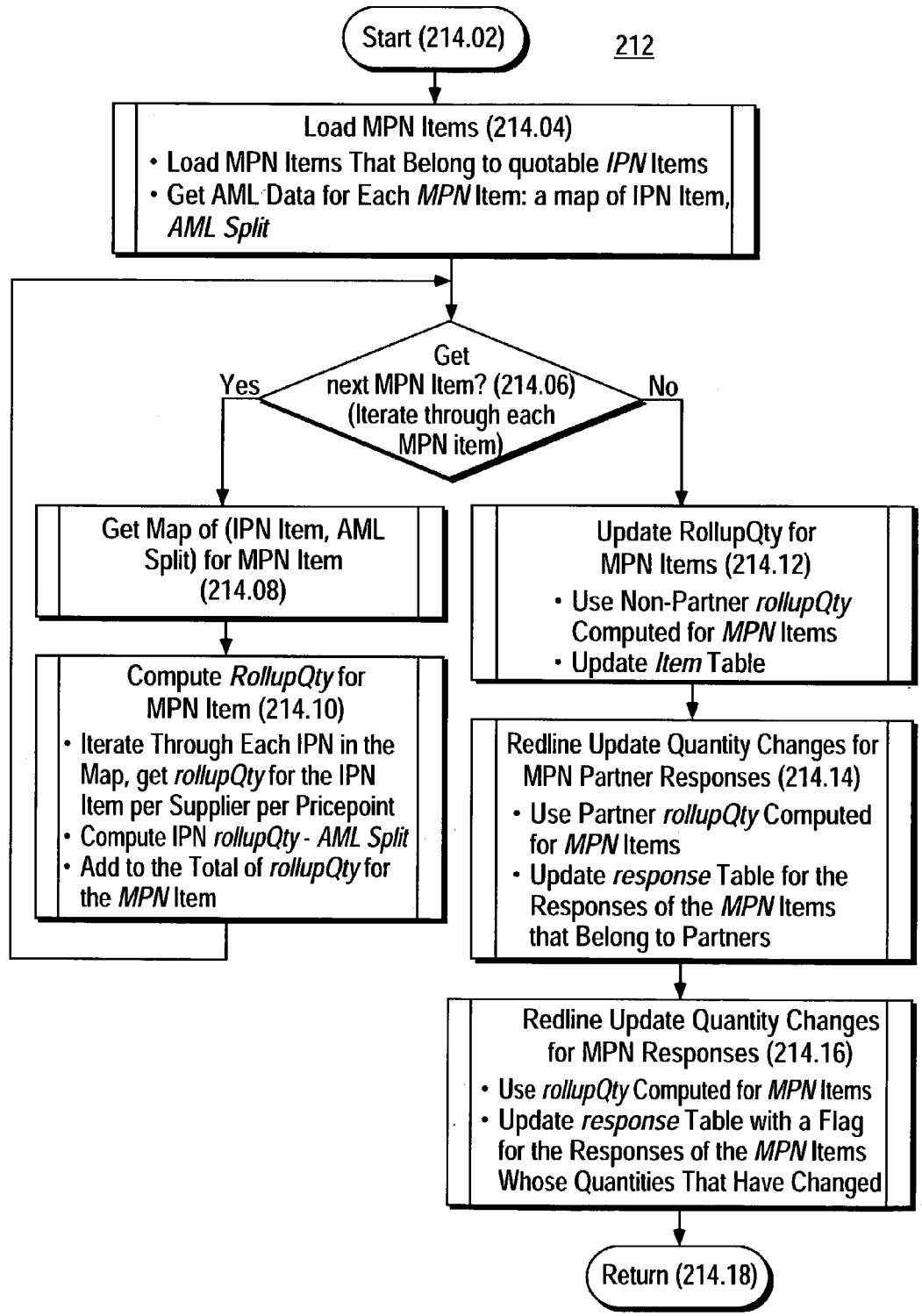
FIG. 2B is a flow diagram of a subprocess of step 214 of FIG. 2A-1 in one embodiment.
Figure 2C:
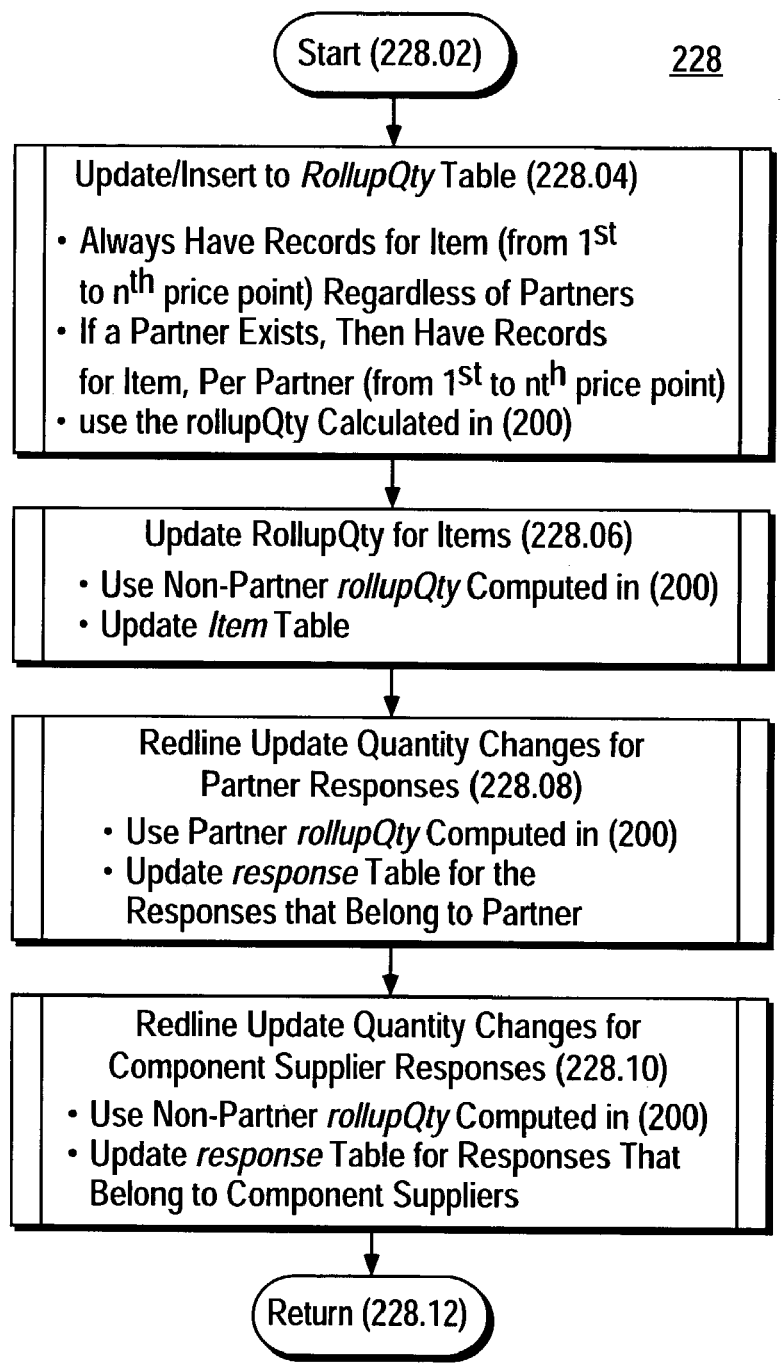
FIG. 2C is a flow diagram of a subprocess of step 228 of FIG. 2B-1 in one embodiment.

Referring to FIG. 1, one embodiment of the invention is illustrated in a flow diagram, where the method is directed to a method of managing a BOM. Such a method would be performed by a BOM item management system configured to execute computer readable code and cause tasks to be performed and mathematical algorithms to be calculated. The method is configured to establish costs for the components of a BOM, with adjustments made for different currencies. This is especially useful for the management of BOMs, particularly for products incorporating component parts produced internationally. It is equally useful in applications of managed projects, where services and tasks are performed, both of which have cost components. In the first step 102, quantity rollup and best/average pricing preconditions are established for the BOM. The quantity rollup is illustrated in FIGS. 2A-2C, and the best/average pricing is illustrated in FIG. 3.

Referring first to FIGS. 2A-1, 2A-2, the BOM material quantity rollup algorithm is illustrated in another flow diagram. In a typical BOM, for a product for example, there exists a top level assembly and associated sub-assemblies. These may be represented by leaf nodes in a tree structure, and may be further designated with internal part numbers (IPNs). In step 202, the initialization process is begun. In this step, the item quote level is set to a null value for non-reachable items. The root of any assembly is reachable. If an assembly or subassembly is reachable, then its child parts are reachable. A quote level part is treated as having no children. Hence, a part is reachable if it can be reached by the above rule. And, the rollup quantity is set to zero in the rollup table.

Figure 5:
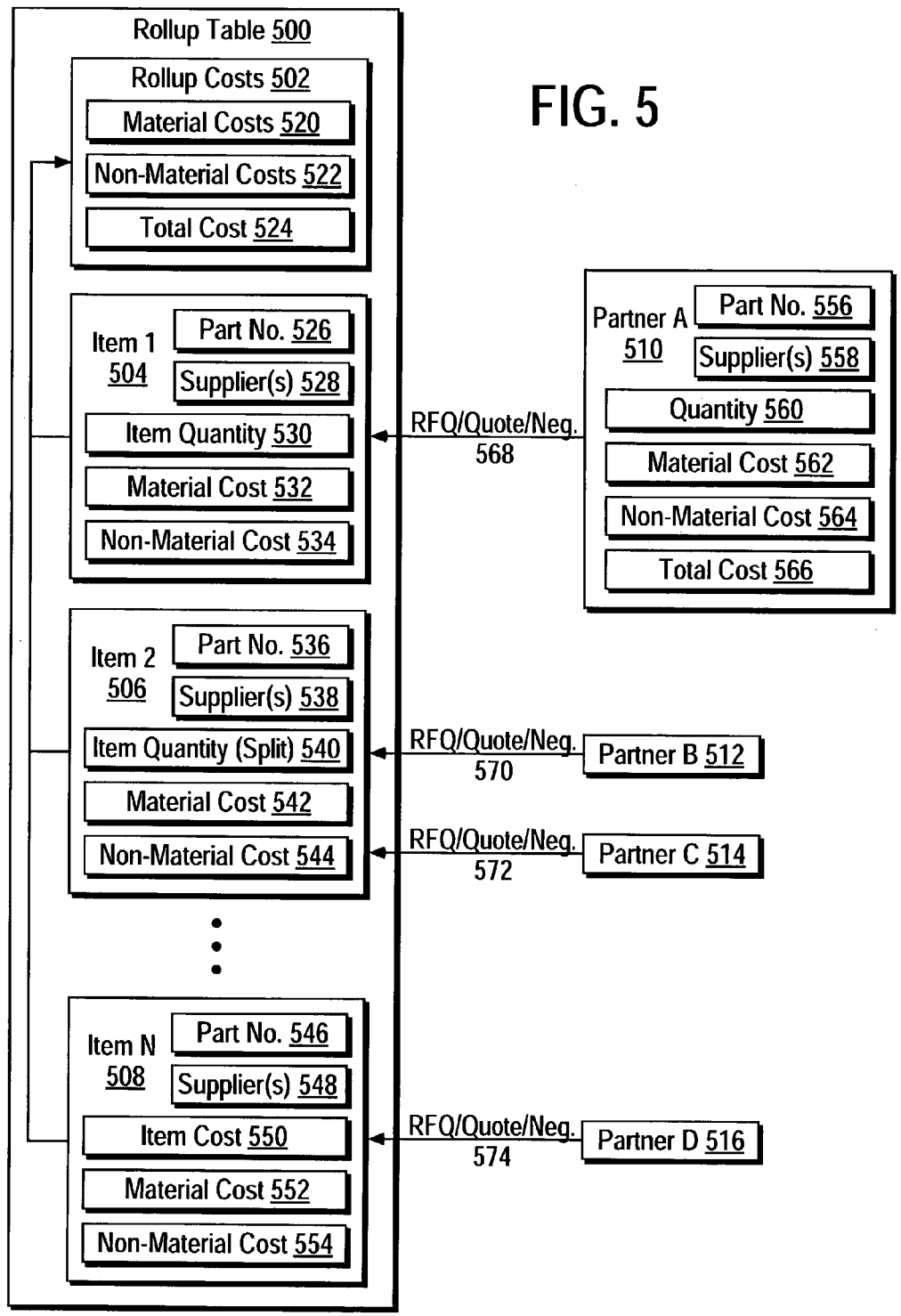
FIG. 5 is an illustration of a sample of a rollup table and its relationships with various partners and component suppliers in one embodiment.

Referring to FIG. 5, a sample of a rollup table and its relationships with various partners and component suppliers is illustrated diagrammatically. This rollup table is a generic example of one used for a product having a final assembly made up of component parts and subassemblies that may be supplied by outside partners and component suppliers. In this embodiment, the rollup table 500 may be stored in a database or other storage medium. If stored in a database, the various entities of the rollup table may be represented as objects, where the objects have associated attributes and possibly extended attributes that may be searched using conventional database techniques. The manner in which accesses and retrievals are made to the database is governed by algorithms. According to the invention, these algorithms are executed by a management system to manage such a rollup table. This is discussed in more detail below.

Still referring to FIG. 5, the rollup table includes a rollup costs module 502 for storing cumulative cost figures for a final assembly. The cost figures to be rolled up are derived from items 504, 506, . . . , 508, which have material and non material costs associated with them as they pertain to assemblies and component parts that may be supplied by partners and component suppliers 510, 512, 514, 516. The rollup costs module 502 includes cumulative costs including material costs 520, non material costs 522 and total costs 524 of an assembly. These cumulative values are derived from costs associated with the individual items. The items are associated with part numbers 526, 536, 546. In a preferred embodiment, the part numbers are standardized with IPNs, regardless of the MPN associated with any subassemblies or component parts supplied by partners or component suppliers. The items may also be identified by supplier numbers 528, 538, 548 in addition to part numbers. This allows the rollup table to keep a history of part numbers, which may change over time, as well as a history of partners and suppliers. Each item has an item quantity 530, 540, 550 associated with it. The item quantity indicates the total assemblies or component parts associated with the item. Each item also has material costs 532, 542, 552 and non material costs 534, 544, 554 that are associated with the items.

Partner A, 510, has a part number 556, which may be a MPN, and may also include a corresponding IPN for the rollup table. The partner also includes a supplier number 558, for use in the rollup table for identifying the partner (or the supplier in the case of a component supplier). The partner also includes a quantity 560 that may indicate the quantity on hand, the quantity projected or the actually quantity supplied as agreed and communicated between the buyer and supplier beforehand. The partner also includes material costs 562, non material costs 564 and total cost 566 associated with the subassembly supplied to the rollup table (or with the component part if a component supplier.).

Each partner provides item data with a corresponding item via a communication link 568, 570, 572, 574, 576. A buyer may send a request for a quote (RFQ) for a subassembly or component part. A supplier or partner then responds with a quote for products or services. The entities may then engage in negotiations between them to work out terms under which the partner or suppliers supply subassemblies or component parts to the buyer. According to the invention, outside entities may exclusively supply subassemblies or component parts related to an item, such as partners A and D. Alternatively, a partner split may exist where two partners supply different proportions to a buyer according to the quantity needed by the buyer. In the negotiation phase of the process, the splits may not be proportional. For example, one partner may offer certain quantities at a particular prices, which may be different than the quantities and prices of another partner. According to the invention, the system may take in the metrics of each partner in the rollup table and calculate the optimal supply proportions for the quantity needed.

Referring again to FIG. 2, in step 204, project data is retrieved from the database. This retrieval process includes retrieving root items and their quantities. For example, in a product assembly application, a root item could be a component of the assembled product. The retrieval process would retrieve the quote level of the component, and would and would include partner assignments and price points for the component. According to the invention, for product quoting, the quote level refers to the privilege level that is designated for an entity that quotes on a component. The quote level may differ for different users accessing the BOM management system Each of the top-level assemblies can have different quantities. For example, if five top-level assemblies existed in a given project, each assembly might have a different demand quantity, e.g. 100, 500, 2000, 5000, or 10000. Furthermore, each assembly at the root level may have different quantities, as they do not need to be identical. The root items can be assemblies, sub-assemblies or IPNs.

According to the invention, while performing a rollup, the BOM is traversed in order to calculate the quantities in each of the branches so that we can roll up the appropriate quantities.

Figure 4:
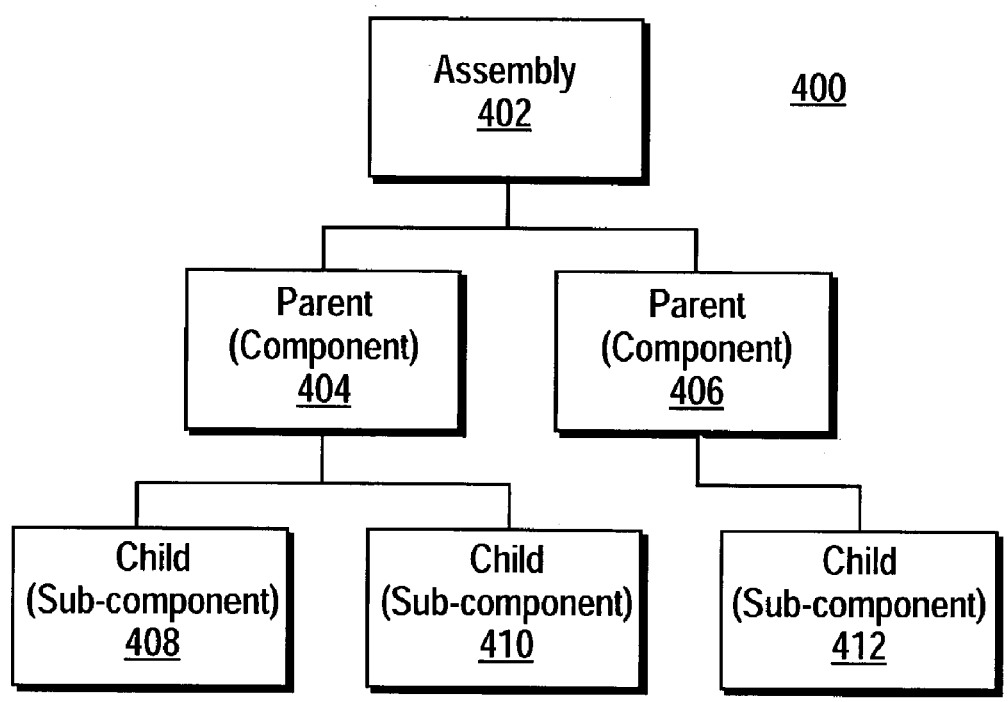
FIG. 4 is a block diagram of system of parent and child relationships in a production application in one embodiment.

In one embodiment of the invention, partner assignments are established among different entities based on an enterprise management application (EMA). The EMA is a hierarchical management structure having logical nodes and means for intercommunication among the nodes. An EMA may include a database and a means for accessing a database to retrieve and analyze BOM items. These entities include providers that may be quoting on, providing components for, or building assemblies of a product. Referring to FIG. 4, a system example 400 of parent and child relationships in a production application are illustrated in a flow chart. An assembly 402 may include a first parent component 404. The parent 404 may include children sub-components 408, 410. The assembly may further include a second parent component 406 having a child component 412. The parents may act as partners also, where they supply the same component to the buyer to produce the assembly 402. The partners may provide these components at similar or disparate cost and supply terms, making the management of the costs of the components and subcomponents complicated. The invention provides a means to manage such scenarios.

In a preferred embodiment, historical records are kept to preserve the history of previous responses. This historical data is preserved for producing historical comparisons of price points. Using these records, one embodiment can produce BOM records with redlined data fields for review by the partners. It is assumed that the roll up quantity has changed since the initial time that it was sent out to the Partner. This is because the buyer would have changed the demand for an assembly. Given that there could be thousands of these affected items, we will display them with an indicia, such as a small icon, is displayed to show the partner that the quantity has changed. Partners could then elect to bid for different price points. The appropriate redline flag is set for this purpose.

For example, partner splits may be a parent node split that includes Company A supplying 40% of a demand, and Company B supplying 60%. This demand proportion may be placed at the top root level, defining the partnership commitments at the higher level nodes. In one embodiment, all children branches in the EMA inherit this setting. In another feature, if a different partner split is defined below the parent node, they take precedent. These alternative partner splits may include different partner percentages, different partners, and other variations in the split scenario. In such a case, the assigned root splits are dominant and are followed, notwithstanding any splits existing in the higher level nodes. Partner splits may exist as far down as the IPN level. At the MPN level, AML splits may also be defined. For example, nodes for partners manufacturing hard drives may include partners supplying 30 GB Hard Drives that are split as split as 40% for Company A and 60% for Company B.

If price points are time periods, quantity prices are the same for the duration of the time period. The process of the BOM rollup is different depending on the type of the project involved. For quantity rollups, each price has a different rollup depending on the quantity. For Time periods, it's the same quantity. It can also be a combination of time periods with different quantity breaks within each period.

Rollups are done for each supplier and the price points. In a preferred embodiment, there are three factors to each price value: the item in that is affected, the price point and the partner associated with the price. In a BOM, there is always a top level assembly. Under there exists assemblies that can have sub-assemblies or Leaf Items, where IPNs may be assemblies, sub-assemblies or leaf items. The node level at which the Supplier is to quote can be preset. All levels below the quote level are then disabled so that the supplier is not able to quote at those levels, which are below its quote level.

The purpose of a quote levels is to limit a supplier's ability to quote certain components, subcomponents or subassemblies. In operation, suppliers and service providers are able to bid on BOM items that are pertinent to what they are allowed to provide to the buyer. Some providers are only permitted to provide limited products or services. For example, a supplier may supply memory chips to a computer buyer that assembles finished computers. The buyer may only wish to purchase individual chips from the supplier, rather than whole memory boards. According to the invention, a BOM management system can limit or block the supplier from accessing such items of the BOM to provide bids only for memory chips. The invention enables a buyer to limit the access of suppliers, blocking them from bidding on certain BOM items.

Non-partner quantities are calculated the same way as partner quantities. The difference between a non-partner and a partner is that a partner is typically an outsourced manufacturer who assembles the product for the buyer, and a non-partner is a component supplier who typically sell standardized components off the shelf. Referring again to FIG. 2A-1, in Step 206, for non-Partner rollup quantity, the quantity rollup is expanded based on the per board quantity (PBQ) of the BOM. For example, a single motherboard may have four 256 MB memory SIMMs. For two boards, there are eight SIMMs. One item of the parent contains a number of items of the children. The partner roll up quantity is equivalent to a PBQ partner split when a partner is assigned explicitly. Otherwise, cumulative aggregation is performed. For example, if a child has a parent and the parent has two partners, the parents are summed independently. For non-partner rollup, partner splits are not done, so it is simply based on the PBQ.

For example, in a hierarchical system organized in a logical tree structure, Company A is parent, and Company B is child of A. Company A may supply a board that has two of Company B's component products. If the total root quantity is 10, then A supplies 10 boards, which necessarily require 20 of B's components. Company A could have two partners where one partner, P1, supplied 50% and another partner, P2, supplied 50%. Therefore, each partner will have five of Company A's components, and ten of Company B's components.

In Step 208, the hierarchical tree structure of the BOM is flattened to an ordered list of items at the IPN level. In the generated list, all the parents of an item come before the item itself. The cost analysis is then iterated through all items starting with parent and working down the list to the children. This enables the computation the quantities and splits by inheriting values from top to bottom of the logical tree structure. Any items below a Quote Level of a supplier would be ignored.

In Step 210, Rollup quantity for all MPNs is updated. If there is No Next Item, it means that the process has reached the end of the list.

In Step 212, the data is flushed and the process proceeds where the IPN rollup values are stored in tables. The appropriate quote levels are then set up.

In Step 214, updated quantities are rolled up for all MPNs. Step 214 is illustrated in more detail in FIG. 2B. In step 214.02, the sub-process is started.

In step 214.04, it is important to consider only those MPNs, which are under quotable IPN items. This is because some IPNs might not be reachable if they occur further down the logical tree structure from a related item where a Quote Level was set. All approved manufacturer list (AML) splits at the MPN level are also loaded.

The process is reiterated via step 214.06, where each MPN is processed until the last one is processed. If there are MPNs available, the process proceeds to step 214.08, where a map of a MPN item is retrieved. It is important to note that each MPN might belong to multiple IPNs. For each MPN, the parent IPNs must be determined and any associated split for them. For example, MPN 1 belongs to IPN 1 and the split is 60%, MPN 1 belongs to IPN 2 and the split is 40%. If there are no splits specified, it is assumed that it is a 100% supply, or no split. Then the Partner roll up quantity is computed. For example, IPN 1 has MPN 1 and IPN2 has MPN 1. If IPN 1 has a quantity of 10 with a Company 1 split at 60%, and if IPN 2 has a quantity of 20 with a Company split at 40%, the result is a Company 1 Partner roll up quantity of 14 (i.e. 6+8). For all component suppliers, the entire IPN quantity is used. Here, the quantity for MPN 1 would be 10+20=30.

In stop 214.10, the rollup quantity is computed for each MPN item. Each IPN in the map is processed, and the roll up quantity for each IPN is obtained for each supplier and for each price point. Then, the IPN roll up quantity and the AML split is computed. An AML Split is the percentage split that the buying company has decided to use from among the many alternative manufacturer parts for the same IPN. Typically, companies spread the risks among multiple vendors to ensure continuity of supply. So for example, they might decide to procure 40 GB hard disks from two different manufacturers and split their procurement 50/50 between both vendors.

$$MPN\ Qty = IPN\ Qty * AML\ Split.$$

The Total of the Roll up Quantity is Added for the MPN Item.

In Step 214.12, once all MPNs have been processed, data that is pertinent to component suppliers is stored in tables. These tables are accessible to the individual component suppliers according to their established access privileges. The non-partner roll up quantity is computed for all MPN items. According to the invention, these tables are stored in a database that is accessible by such suppliers for quoting, and are updated when the non-partner roll up quantity is computed.

In Step 214.14, data that is pertinent to partners is stored in tables for such partners. According to the invention, this data may be stored in a redline manner, showing historical changes related to a supplier. According to the invention, these tables are stored in a database that is accessible by such partners for quoting. In operation, there may be back and forth negotiation and order changes between a supplier and a buyer, and the historical record is useful to both parties. These negotiation notes may be stored in the table for review by the buyers and suppliers. These tables, response tables, may be updated in this step according to the partners' relationships. Such response tables may be separate from item tables. Item tables separately store information related to the cost information of the items, such as price, quantity, demand, supply, and other cost factors. The tables may be treated the same with respect to privileges of the supplier, but may be treated separately for storing and maintaining the information.

In Step 214.16, if a quantity of a line that is quoted to a supplier changes subsequently during rollups, it is indicated by a flag. The responses are flagged in this step to indicate that changes were made after a rollup, so that partners can be alerted that subsequent changes were made. This is used to notify the supplier. Subsequent rollups can then be invoked to update the BOM.

In Step 214.18, the process returns to the calling routine, and the process proceeds to Step 216.

Referring again to FIG. 2A-1, in Step 216, a process to Cleanup data is invoked. In this step, information in the response tables can be removed when obsolete. For example, if a partner is removed, its responses can be deleted. Also, records with zero quantity values can be deleted, showing no activity. Quote levels can be set to be non-reachable for certain items on the item table. In a quote level, the buyer decides that he does not want to explode or expand the BOM further down, so the items below this level are not reachable while traversing the BOM using the business rules in the Quote Level setup. This way, the system provides the user with the flexibility to determine the appropriate level of granularity when a bid price is provided by the partner.

Referring back to Step 210, if there is a next item, the process proceeds to Step 218. In Step 218, the process checks whether a partner was explicitly assigned to the item. If explicitly assigned, the process proceeds to Step 220, if not assigned, it proceeds to Step 222. In Step 220, if a partner was explicitly assigned, a process is invoked to compute the roll up quantity by multiplying the Non-Partner roll up quantity by the Partner split. For example, if the parent has a partner and the child also has the same partner, they both are explicitly assigned with a different percentage. If parent A is set at 60% and child B is set at 80%. Then it is assumed that the intention is to given more business of the child item to the partner than of the parent's actual items. The child's assignment is then used and the parent's is ignored.

Referring again to Step 218, if not assigned, the process proceeds to Step 222. Also, if explicitly assigned, the process proceeds from Step 220 to Step 222. In Step 222, if partner was not assigned but inherited from the parent, the roll up quantity is computed. This is done by adding the child roll up quantity to the parent roll up quantity multiplied by the Child BOM quantity.

In another embodiment, a child can be under two parents in the logical tree structure. When the price point for the child is calculated under the first parent, it is a calculation of a partial quantity of the child. When the price point is calculated under the second parent, then the full quantity of the child is achieved. This is reiterated for each of the different price points.

In Step 224, for scalability and performance purposes, a list is maintained in memory.

In Step 226, once the number of items in the list reaches a preset limit, it is flushed by writing to the database tables.

If the number of items in the list reaches a predetermined number, the process proceeds Step 228. This limit is used to restrict the maximum memory footprint that is utilized during the calculation. The system will write data off after reaching the limit so that the system memory is freed up. In Step 228, a Flush Data Procedure is performed for memory management.

FIG. 2C is a more detailed flow diagram illustrating the flush process. Step 228.02 is the start of procedure. In Step 228.04, various data handling tasks are invoked for the roll up quantity table. In this procedure, all of the price points for an item are maintained over time, and records of the date of the price points are also indicated. These records may be maintained according to and item, illustrating the history of the item, including past prices, past partners, quantities, etc. The quantity rollup value may be that calculated in Step 222. These values may be stored in a database using conventional methods, such as storing them at database address locations according to the database data management procedures.

In the next step, Step 228.06, the item table is updated. The non-partner rollup quantity is updated using the value computed in Step 220.

In Step 228.08, a procedure is invoked to update the partner responses in the response table. The responses may be stored in a redline manner, showing the historical changes in the responses. The rollup quantity is then updated using the value calculated in step 220. This is similar as that which was done for MPNs in step 212.16

In Step 228.10, a procedure is invoked to update the partner responses in the response table, which is similar to Step 226.08, but now for the Component Suppliers. The response tables are updated for responses that belong to component suppliers.

In Step 228.12, the process returns to the calling routine, returning to Step 230.

In Step 230, the process clears the item list from memory and resets the flags. The process then continues to traverse the BOM tree in Step 228. Once all items have been addressed by the process, the process proceeds back to FIG. 1, Step 102.

Figure 3A:
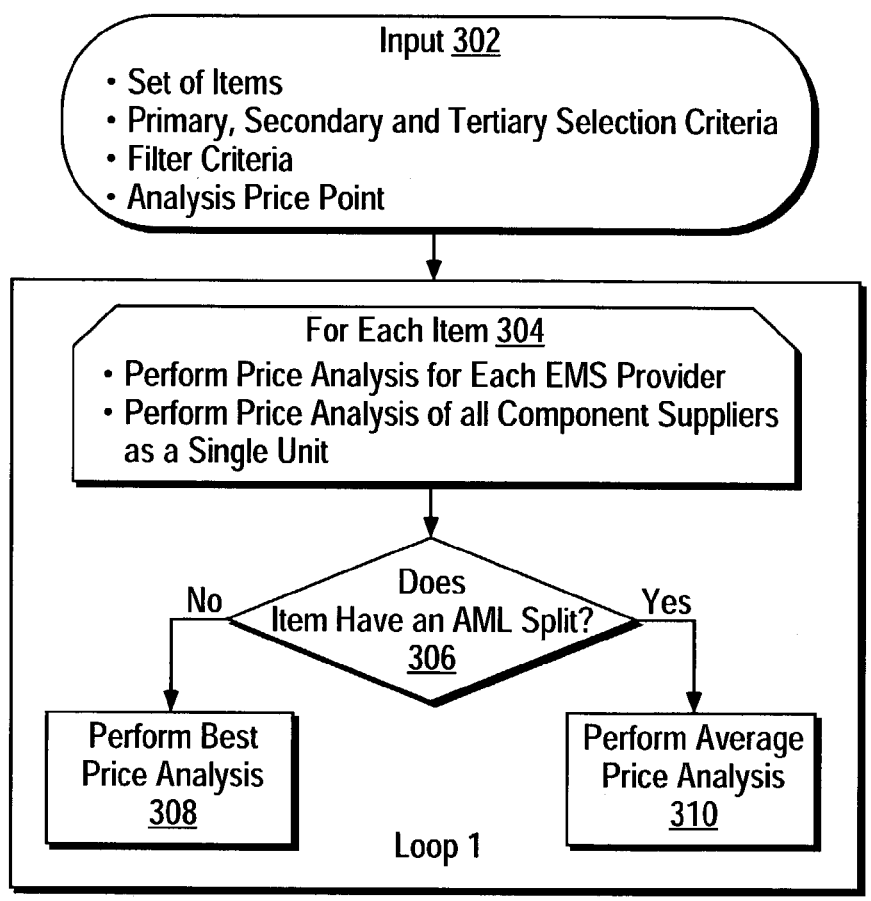
FIG. 3A is a flow diagram of a method of setting the best/average prices in pre-conditions step 102 of FIG. 1 in one embodiment.

Referring again to FIG. 1, the next step in the preconditions is to set the best/average prices. This is illustrated in FIG. 3. FIGS. 3A-3C illustrate embodiments of such a process 300.

Referring first to FIG. 3A, in step 302, the optimal prices are set based on Best or Average Prices. Possible Selection Criteria may include by Cost, by Lead Time, by Cost within Lead Time Constraints, by Supplier Rating or by AML Rating. Possible Filter Criteria are Alternate AML, and Published, Historical, or Catalog Prices. Each IPN usually will have many responses if it has many MPNs under it, or if multiple Components suppliers have responded to it. The process thus arrives at a single price using average or best price methods.

In Step 304, the inputs are received. For EMS partners, there are splits in place, so prices must be picked. For example, to buy from both Company A and Company B, a best price is needed for each company. In the case of component suppliers, a buyer will source from only one of them, so all three of them are compared to select a single best price.

In Step 306, the system checks whether there is an AML split at the MPN level. If there is no split, then the process proceeds to Step 308. If there is a split, the process proceeds to Step 310.

In Step 308, if there is no AML split, the process performs the Best Price Analysis. This process is shown in more detail in FIG. 3B. In Step 308.02, FIG. 3B, the supplier inputs are retrieved. In this process, all of the MPNs of the item are considered. The type of price is determined by the filter criteria, and all prices of all price points that subsume the analysis price point are considered. For EMS partners, there are splits in place so we have to pick a price for it from among the MPNs. For example, if a company were to buy from both Company A and Company B, a best price is needed for each. In the case of component suppliers, a purchaser would source from only one of them, so all three are compared, and the best price is selected from among different components suppliers across MPNs.

In Step 308.04, the selection criteria are used in the case of tie breaks needed among partners. These are based on input selection criteria by the user. In the case of a tie break, secondary ant other selection criteria are applied. Selection criteria can include functions such as breaking a tie by lowest cost, or shortest lead time. Multiple criteria may be applied to break a tie. The final decision may be arbitrary in the event that all criteria are equal. For example, in the case of component suppliers, if three MPNs exist, three component suppliers would be needed, resulting in three selections. In the case of Partners, there may be three IPNs with three MPNs each, giving nine different selections. In this situation, filters are used to cut down through the nine different selections. Also, Each IPN may have several MPNs with prices for each of the MPNs. In a preferred embodiment, for organization, the buyer must get to a single price for each IPN. This does not translate to 9 selections as in the example, but rather 3. Once a single price for each IPN is selected, then the BOM roll up can be performed. In the case of an EMS Provider, the winning bid for the buyer may be defined by an MPN manufacturer. In the case of component suppliers bidding a component, the winning bid s defined by a component supplier and an MPN. The winning bid can then be copied to an item or analysis table.

Referring again to FIG. 3A, the process of rolling up the BOM proceeds to Step 310, where retrieve the necessary project data is retrieved. This is shown in more detail in FIG. 3C, which shows more detail for performing Average Price Analysis for an AML split. Referring to FIG. 3C, in Step 310.02, the process applies the filter criteria and loops thru all price points. All MPNs of the item that meet the filter criteria are considered. The prices of al price points that subsume the analysis price point are considered. All price points are looped through the process until all points are considered. Costing can be performed not just for actual but also for forecasts and trends. The process would iterate over the number of such costs or forecasts as in the case of the BOM traversal.

In Step 310.04, the process retrieves the weighted average on MPN splits for all MPNs. In this process, the lowest cost price for each MPN is chosen. This may be done across all component suppliers. In the case of an EMS provider, there may be only one price. Using the lowest cost, the weighted average (WAC) cost is computed. This may be done across all MPNs in the AML, based on any AML split. The item or analysis table is updated with the average price for each price point.

Referring back to FIG. 1, in Step 104, the process retrieves the necessary project data.

In Step 106, the necessary data is retrieved from the Rollup table. The rollup quantity, best prices and partner information, whether explicit or inherited are retrieved. When a buyer assigns a partner to an assembly that is explicit partner assignment. While doing so, of all the children of that assembly also inherit the parent partner, where the partner needs the child item to make the parent. This is an implicit partner assignment.

In Step 108, when quantities of goods or components are being computed, quantities are first computed for the parent node, and then the process traverses down to the child nodes to determine their quantities. In case as illustrated, costs are being computed. Therefore, the process must traverse from the children nodes and roll the costs up to the parent node. In such a configuration, the network is arranged in a reverse topological order. If an item has a parent that is at the quote level, any partner has been blocked from bidding here. Therefore the item whose parent is at the quote level is ignored.

In Step 110, a flattened list of items is generated down to the lowest level as an ordered list. In this list, all the children nodes of an item occur before the item itself. Then, there is a check to determine whether the last item has been reached. If the last item has been reached, the process continues to Step 112. Once the last item has been reached, then the process proceeds to Step 114.

In Step 112, once the last item has been reached so store the cost data.

In Step 114, the process checks if the item is the lowest level i.e. either a leaf or a Quote Level below which no quotes are to be provided. If the item is a leaf or a quote level, the process returns to Step 108 to continue traversing the BOM tree. If the item is not a leaf or at a quote level, then the process proceeds to Step 116.

In Step 116, if the item is not a leaf and not a quote level, the process initializes the itemized total price to be zero.

In Step 118, the process checks if the item has either an explicitly assigned or inherited Partner. If the item has an explicitly assigned or inherited partner, the process proceeds to Step 128. If the item does not have an explicitly assigned or inherited partner, it proceeds to Step 120.

Loop 1 begins in Step 120. In Step120, if a parent has no partners assigned but the child has partner assigned. If, for example, there is a partner split on a child node as 50% Company A and 50% Company B. If Company A quoted $4 and Company B quoted $2, the average is computed and the cost price will be $3. The price is fictional, but it allows a user to analyze the BOM completed for costing purposes, taking into account any accuracy issues.

In Step 122, the process verifies whether the average cost is null, thus whether no cost has been provided. If the average cost is not zero, then the process proceeds to Step 124. In Step 124, if the average is not a null, the process is able to do a full rollup using the formula:

$$\text{child average cost} * \text{BOM quantity}.$$

The process will then multiply by the Currency Exchange Rate, if needed. Children node currencies are converted to the parent node's currency as it is rolled up.

Referring back to Step 122, if the average prices is null, then the process moves to Step 126. In Step 126, the concept of a partial rollup is illustrated. For example, if there are 3 child nodes, and only 2 of them have been quoted, the third node will have NULL as an average cost. This is not the same as 0 (free) cost. The rollup will be partial because one of the children nodes does not have a price yet. For example, a flag may be shown as an asterisk in the UI is displayed to inform buyers that this is a partial rollup.

Loop 2 begins in step 128, and is a similar procedure as Loop 1 except that there's no averaging done and actual costs are used.

In Step 130, the process retrieves the partner cost for each child

In Step 132, the process verifies whether the average cost is null, i.e. no cost has been provided.

In Step 134, if the average is not a null, the process can do a full rollup using the formula:

$$\text{child partner cost} * \text{BOM quantity}.$$

We'll multiply by Currency Exchange Rate, if needed. Children currencies are converted to the parent's currency as they are rolled up.

In Step 136, if the child partner cost is null, then the process sets the parent item partner cost as a partial cost. Here, the null value in child record means that there is no price for the child in which case the parent item will have only partial costs.

Then process then proceeds to back to Step 108, where the BOM is traversed until all items are reached.

Figure 6:
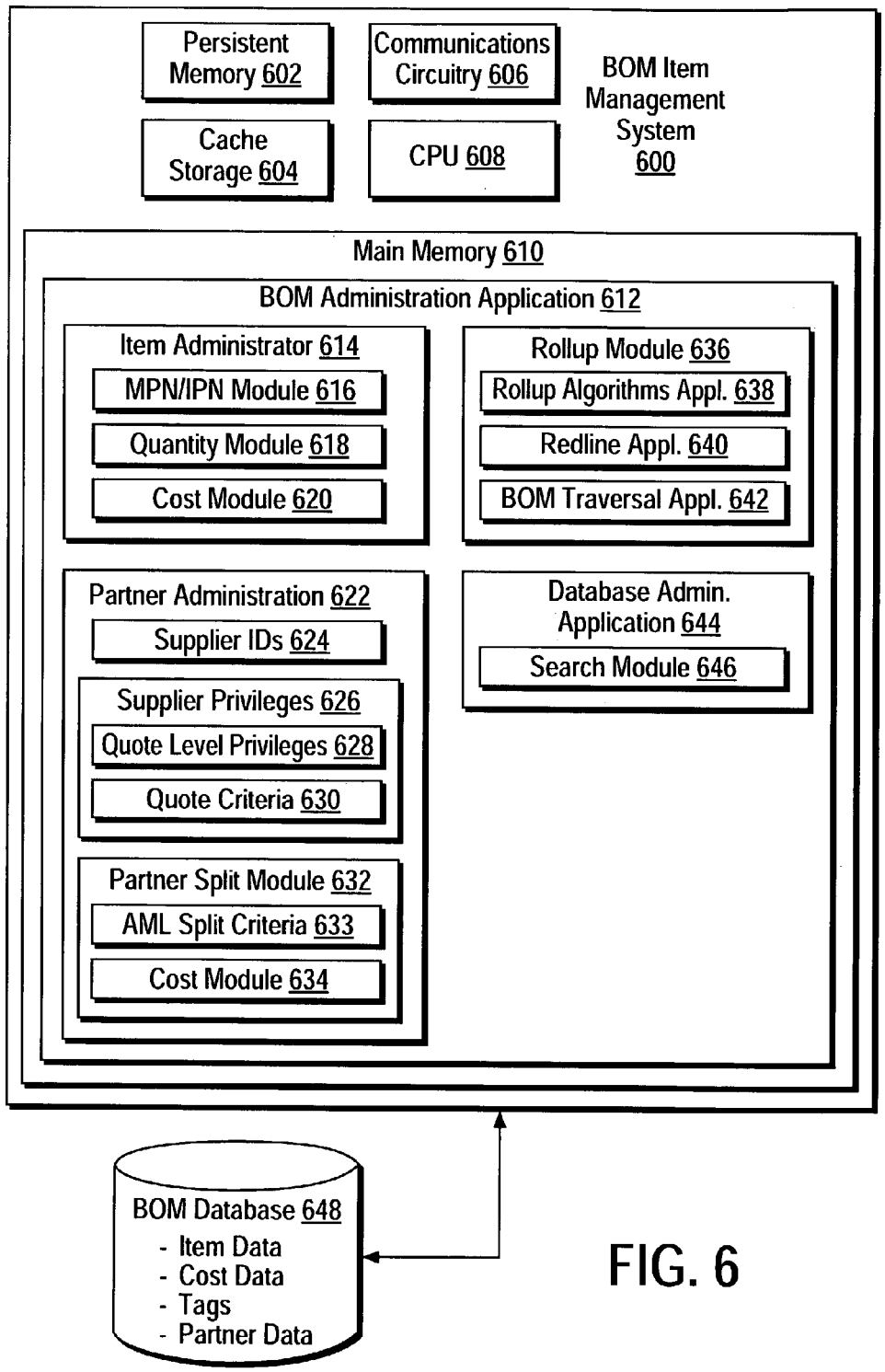
FIG. 6 is a block diagram of an example of a BOM item management system computer in one embodiment.

Referring to FIG. 6, an example of a BOM item management system computer 600 is illustrated. The BOM items management system may be located in a central server connected to a database for efficient management of the database. In other embodiments, the BOM items management system may be a distributed system, where the different administration (local, global or otherwise) may be distributed among different entities or different users. In one embodiment, the BOM items management system is software program code that is executable by a computer system configured to run programs and accomplish certain tasks related to the management and implementation of BOM items. The system 600, includes a persistent memory 602 configured to store frequently used information. The system may also included communication circuitry 604 configured to communicate with other computers and devices that may be connected via a network, wireless systems or other types of communication systems. The system may also include cache storage 606 for storing information that is frequently used by the CPU 608, and for loading information from the main memory 610 for faster and efficient access by the CPU.

The main memory 610 includes a BOM administrative application 612, or BOM administrator, containing software code, programs and algorithms necessary for managing BOM items. The item administrator application 614 is configured to manage the BOM items. The item administrator includes MPN/IPN module 616 configured to manage the designations of the MPNs coming from outside manufacturers and for associating the MPNs with corresponding IPNs useable in a buyer's system. The cost module 620 is configured to retrieve cost information associated with particular items.

The BOM administrator is further configured with a partner administrator 622, configured to manage partner information and their associations with items. The partner administrator includes a supplier IDs module 624 configured to manage the identifications of partners and component suppliers. The supplier privileges module 626 is configured to manage a supplier's access to provide quotes to a buyer. In order to properly organize the rollup of a BOM, for example, a buyer needs to control any partner's or other supplier's ability to provide quotes for items. For example, if a buyer is only interested in receiving quotes for a particular subassembly, it would block a supplier from quoting on a component part of that subassembly. For this, Quote Level privileges module 628 is configured to allow a buyer to establish such restrictions on quotes. In doing so, quote criteria 630 is provided for establishing such limitations.

Partner spit module 632 is configured to manage and maintain partner splits in a rollup table. AML split criteria module 633 allows a buyer to establish split criteria among partners that will jointly supply subassemblies, or component parts in the case of a component supplier. Cost module 634 is configured to allow a buyer to manage and maintain cost criteria associated with such splits among partners.

The BOM administrator further includes rollup module 636 configured to manage the rollup operations of the BOM. The rollup module includes rollup algorithms application 638. The rollup algorithms are software representations of mathematical operations used in rolling up costs in a BOM. The rollup module further includes a redline application 640 configured to highlight changes made during a rollup. This module allows the system to maintain a history of rollup information, including past costs data, partners, suppliers, and other rollup information that may change over time. The BOM administrator also includes a BOM traversal application 642 configured to traverse the hierarchical structure of the BOM, and to roll up cost data. The manner in which a BOM is traversed is governed by algorithms in the rollup module, and may be established according to a buyer's application of the BOM item management system.

The BOM item management system further includes a database administration application 644 configured to access a database. The database administration application includes a search module 646 configured to access a database 648 and search out data. Conventional database administrator applications and search modules are well known in the art.

In general, embodiments of the invention may include the utilization of dedicated processors, webservers configured to receive and route communication signals among application servers, state servers and other types of computer processors configured to communicate amongst each other and that may be connected to one or more networks, including a Local Area Network (LAN), an intranet and the Internet. However, it will be appreciated by those skilled in the art, implementation of such devices and systems are but few illustrations of the utility of the invention, and that the invention may have greater applicability and utility in many other applications where efficient routing and processing of data within one or more networks is involved. Equivalent structures embodying the invention could be configured for such applications without diverting from the spirit and scope of the invention. Although this embodiment is described and illustrated in the context of devices and systems for exchanging data among users of a computer system or network, the invention extends to other applications where similar features are useful. The invention may include personal computers, application servers, state servers or Internet webservers that are designed and implemented on a computer and may be connected to a network for communication with other computers to practice the invention. A system configured to operate according to the invention may include a plurality of personal computers connected to the Internet via individual modems or other communication means such as wireless communications.

If on a separate computer, it will be apparent that the client processor is conventional and that various modifications may be made to it. Data can be stored in the database, or may optionally be stored in data files, which gives a user an organized way to store data. The client processor may also include a conventional operating system, such as Windows, for receiving cost information to develop and maintain.

The invention may also involve a number of functions to be performed by a computer processor, such as a microprocessor. The microprocessor may be a specialized or dedicated microprocessor that is configured to perform particular tasks by executing machine-readable software code that defines the particular tasks. The microprocessor may also be configured to operate and communicate with other devices such as direct memory access modules, memory storage devices, Internet related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention.

Within the different types of computers, such as computer servers, that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such computers for maintaining information that is frequently retrieved by a central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. The invention is not limited to any particular type of memory device, or any commonly used protocol for storing and retrieving information to and from these memory devices respectively.

The apparatus and method include a method and apparatus for enabling and controlling componentized content within documents in conjunction with the operation of a software application. Although this embodiment is described and illustrated in the context of a software application for managing information related to a BOM, the scope of the invention extends to other applications where maintenance of cost data at either a data source or destination is useful. Furthermore, while the foregoing description has been with reference to particular embodiments of the invention, it will be appreciated that these are only illustrative of the invention and that changes may be made to those embodiments without departing from the principles of the invention.

The invention claimed is:

1. A method comprising:
defining, by a computer system, a hierarchy for a product, the hierarchy including at least:
a first node corresponding to a first component of the product, the first node specifying a first supplier for the first component; and
a second node corresponding to a second component of the product, the second node specifying a second supplier and a third supplier for the second component, the second and third suppliers being distinct from the first supplier;
storing, by the computer system in the first node, a price quote from the first supplier for the first component;
storing, by the computer system in the second node, a price quote from the second supplier and a price quote from the third supplier for the second component;
automatically traversing, by the computer system, the hierarchy to determine cost information for the first and second components, the cost information for the first component being based in part on the price quote from the first supplier, the cost information for the second component being based in part on the price quotes from the second and third suppliers; and
generating, by the computer system, a cost estimate for the product by rolling up through the hierarchy the cost information for the first and second components,
wherein a supplier split defined for the second node in the hierarchy corresponding to the second component is inherited by a third component below the second component in the hierarchy;
wherein generating the cost estimate comprises rolling up cost information for the first component and ignoring cost information for components below the first component in the hierarchy in response to setting a quote level for the first node in the hierarchy corresponding to the first component.

2. The method of claim 1, wherein the cost information for the first and second components is further based on criteria including one or more of the following: historical prices, catalogs, foreign currency rates, and time-dependent pricing.

3. The method of claim 1 wherein the first and second nodes are stored as first and second objects in a database, each object including one or more tags indicating attributes of the node, and
wherein determining the cost information for the first and second components comprises:
performing a database search to locate the first and second objects based on their respective tags; and
calculating the cost information with an algorithm using the first and second objects.

4. The method of claim 1 wherein determining the cost information for the second component comprises:
retrieving average cost data for the second component;
storing the average cost data in the second node;
analyzing the average cost data to derive a cost factor; and
determining the cost information for the second component based on the cost factor.

5. The method of claim 1, wherein determining the cost information for the first and second components comprises:
if there is available cost data for the first component or the second component, determining the cost information for the first component or the second component based on its available cost data; and
if there is no available cost data for the first component or the second component, determining the cost information for the first component or the second component based on projected cost data, the projected cost data including the price quotes received from the first, second, and third suppliers.

6. The method of claim 5, wherein the projected cost data includes data derived from historical records associated with a bill of materials for the product.

7. The method of claim 5, wherein the projected cost data for the second component includes an average of the prices quotes from the second and third suppliers.

8. The method of claim 1, wherein generating a pricing estimate by rolling up the cost information for the first and second components comprises converting the cost information for the first and second components into a standard currency.

9. The method of claim 1, wherein generating a pricing estimate by rolling up the cost information for the first and second components comprises taking into account time periods for which the cost information is valid.

10. The method of claim 1, wherein the supplier split defined for the second node is used for the third component when no supplier split is otherwise defined for the third component.

11. The method of claim 1, wherein a supplier split defined for the third component takes precedence over the supplier split for the second node when determining the supplier split for the third component.

12. The method of claim 1, wherein a partner is assigned to a parent node that represents an assembly, and one or more child nodes of the parent node inherit the partner, wherein the partner needs one or more items represented by the one or more child nodes to make the parent.

13. A non-transitory computer-readable storage medium having stored thereon program code executable by a computer system, the program code comprising:
code that causes the computer system to define, a hierarchy for a product, the hierarchy including at least:

a first node corresponding to a first component of the product, the first node specifying a first supplier for the first component; and a second node corresponding to a second component of the product, the second node specifying a second supplier and a third supplier for the second component, the second and third suppliers being distinct from the first supplier;

code that causes the computer system to store, in the first node, a price quote from the first supplier for the first component;

code that causes the computer system to store, in the second node, a price quote from the second supplier and a price quote from the third supplier for the second component;

code that causes the computer system to automatically traverse the hierarchy to determine cost information for the first and second components, the cost information for the first component being based in part on the price quote from the first supplier, the cost information for the second component being based in part on the price quotes from the second and third suppliers; and code that causes the computer system to generate a cost estimate for the product by rolling up through the hierarchy the cost information for the first and second components wherein a supplier split defined for the second node in the hierarchy corresponding to the second component is inherited by a third component below the second component in the hierarchy;

wherein the code that causes the computer system to generate the cost estimate comprises code that causes the computer system to roll up cost information for the first component and ignore cost information for components below the first component in the hierarchy in response to setting a quote level for the first node in the hierarchy corresponding to the first component.

14. A system comprising:

a processor configured to:

define a hierarchy for a product, the hierarchy including at least:

a first node corresponding to a first component of the product, the first node specifying a first supplier for the first component; and a second node corresponding to a second component of the product, the second node specifying a second supplier and a third supplier for the second component, the second and third suppliers being distinct from the first supplier;

store, in the first node, a price quote from the first supplier for the first component;

store, in the second node, a price quote from the second supplier and a price quote from the third supplier for the second component;

automatically traverse the hierarchy to determine cost information for the first and second components, the cost information for the first component being based in part on the price quote from the first supplier, the cost information for the second component being based in part on the price quotes from the second and third suppliers; and generate a cost estimate for the product by rolling up through the hierarchy the cost information for the first and second components, wherein a supplier split defined for the second node in the hierarchy corresponding to the second component is inherited by a third component below the second component in the hierarchy;

wherein to generate the cost estimate the processor is further configured to roll up cost information for the first component and ignore cost information for components below the first component in the hierarchy in response to setting a quote level for the first node in the hierarchy corresponding to the first component.

\* \* \* \* \*